(12) United States Patent
Pan

(10) Patent No.: US 12,333,341 B2
(45) Date of Patent: Jun. 17, 2025

(54) MANAGING A DIGITAL ASSISTANT WORKFLOW

(71) Applicant: Beijing Zitiao Network Technology Co., Ltd., Beijing (CN)

(72) Inventor: Yuyang Pan, Beijing (CN)

(73) Assignee: Beijing Zitiao Network Technology Co., Ltd., Beijing (CN)

(*) Notice: Subject to any disclaimer, the term of this patent is extended or adjusted under 35 U.S.C. 154(b) by 0 days.

(21) Appl. No.: 18/636,927

(22) Filed: Apr. 16, 2024

(65) Prior Publication Data

US 2025/0138891 A1 May 1, 2025

(30) Foreign Application Priority Data

Oct. 27, 2023 (CN) .......................... 202311415869.8

(51) Int. Cl.
*G06F 9/50* (2006.01)
(52) U.S. Cl.
CPC .................. *G06F 9/5027* (2013.01)
(58) Field of Classification Search
CPC ..... G06F 8/30; G06F 8/33; G06F 8/34; G06F 8/36; G06F 3/0482; G06F 3/0486; G06F 9/5027; G06F 9/54; G06F 9/5038
See application file for complete search history.

(56) References Cited

U.S. PATENT DOCUMENTS

| | | | |
|---|---|---|---|
| 9,961,191 B1 | 5/2018 | DeMaio et al. | |
| 11,435,871 B1* | 9/2022 | Luvaas | G06F 3/0486 |
| 11,636,401 B2* | 4/2023 | Dhingra | G06N 5/04 |
| | | | 706/12 |
| 2017/0091673 A1* | 3/2017 | Gupta | G06N 5/022 |
| 2017/0147296 A1* | 5/2017 | Kumar | G06Q 10/06 |
| 2019/0228261 A1* | 7/2019 | Chan | G06F 16/221 |
| 2019/0324893 A1* | 10/2019 | Vaishnav | G06F 11/3664 |

(Continued)

FOREIGN PATENT DOCUMENTS

| | | |
|---|---|---|
| CN | 109313665 | 2/2019 |
| CN | 111310936 | 6/2020 |

(Continued)

OTHER PUBLICATIONS

International Search Report and Written Opinion in International Appln. No. PCT/CN2024/087598, mailed on Jul. 1, 2024, 5 pages (with English translation).

(Continued)

*Primary Examiner* — Hiren P Patel
(74) *Attorney, Agent, or Firm* — Fish & Richardson P.C.

(57) ABSTRACT

A method, apparatus, device, and medium for managing a workflow are provided. In one method, in response to receiving a creation request, a page for creating the workflow is presented. The workflow is used to define a plurality of sequential operations in a predetermined task. The page comprises: a first region for providing a plurality of nodes, and a second region for providing a content of the workflow. The plurality of nodes comprises a model node for calling a machine learning model. In response to receiving an interaction request for the page, the workflow is managed based on the interaction request. The model node allows the powerful processing power of a machine learning model to be called in the workflow to complete predetermined tasks of the digital assistant.

20 Claims, 8 Drawing Sheets

(56) References Cited

U.S. PATENT DOCUMENTS

| | | | |
|---|---|---|---|
| 2020/0050949 A1* | 2/2020 | Sundararaman | G06F 40/284 |
| 2020/0202273 A1* | 6/2020 | Lehmann | G06Q 10/06316 |
| 2020/0371903 A1* | 11/2020 | Straub | G06F 11/3684 |
| 2021/0081298 A1* | 3/2021 | Gardner | G06F 11/3452 |
| 2021/0081837 A1* | 3/2021 | Polleri | G06N 5/022 |
| 2021/0081841 A1* | 3/2021 | Sikka | G06N 3/045 |
| 2021/0136027 A1* | 5/2021 | Barbitta | H04L 67/306 |
| 2021/0256076 A1 | 8/2021 | McMurray et al. | |
| 2021/0334698 A1* | 10/2021 | Vo | G06N 20/00 |
| 2022/0076828 A1* | 3/2022 | Zhang | G06F 16/31 |
| 2022/0138004 A1* | 5/2022 | Nandakumar | G06N 5/01 718/102 |
| 2022/0206773 A1* | 6/2022 | Arora | G06F 9/4881 |
| 2022/0206774 A1* | 6/2022 | Arora | G06F 8/34 |
| 2022/0308903 A1* | 9/2022 | Chakraborty | G06F 3/04817 |
| 2022/0405658 A1 | 12/2022 | Mitra et al. | |
| 2023/0083891 A1* | 3/2023 | Achin | G06F 40/18 715/762 |
| 2023/0230584 A1* | 7/2023 | Kanungo | G10L 15/1822 |
| 2023/0259788 A1* | 8/2023 | Eelen | G06N 3/105 706/25 |
| 2024/0005243 A1* | 1/2024 | Hilerio | G06Q 10/0633 |
| 2024/0053877 A1* | 2/2024 | Du | G06F 3/0486 |
| 2024/0169413 A1* | 5/2024 | Price | G06Q 30/0631 |
| 2024/0281837 A1* | 8/2024 | Andrews | G06Q 30/0203 |
| 2024/0320714 A1* | 9/2024 | West | G06F 9/453 |
| 2024/0320961 A1* | 9/2024 | Shimada | G06V 10/774 |
| 2024/0362735 A1* | 10/2024 | Lombard | G06Q 10/0635 |

FOREIGN PATENT DOCUMENTS

| | | |
|---|---|---|
| CN | 112558938 | 3/2021 |
| CN | 112906825 | 6/2021 |
| CN | 113052322 | 6/2021 |
| CN | 114971505 A | 8/2022 |
| CN | 115357365 | 11/2022 |
| CN | 115455135 | 12/2022 |
| CN | 115629743 | 1/2023 |
| CN | 115906918 A | 4/2023 |
| CN | 116414384 | 7/2023 |
| CN | 116466930 | 7/2023 |

OTHER PUBLICATIONS

Office Action in Chinese Appln. No. 202311415869.8, dated Sep. 3, 2024, 24 pages (with English translation).

Notification to Grant Patent in Chinese Appln. No. 202311415869.8, dated Jan. 6, 2025, 5 pages (with English translation).

Office Action in Chinese Appln. No. 202311415869.8, dated Dec. 3, 2024, 12 pages (with English translation).

* cited by examiner

MANAGING A DIGITAL ASSISTANT WORKFLOW

CROSS-REFERENCE TO RELATED APPLICATIONS

The present application claims priority to Chinese Patent Application No. 202311415869.8, filed on Oct. 27, 2023, the entirety of which is incorporated here by reference.

FIELD

Embodiments of the present disclosure generally relate to the field of computers, and more particularly to managing a workflow.

BACKGROUND

Digital assistants are provided to assist users in various task processing needs in different applications and scenarios. Digital assistants usually have intelligent conversation and task processing capabilities. During the interaction with a digital assistant, a user inputs an interactive message, and the digital assistant provides a response message in response to the user input. Typically, digital assistants can support users to input questions in a natural language and perform tasks and provide replies based on the understanding of the natural language input and logical reasoning capabilities of the digital assistants. However, digital assistants are usually unable to handle tasks involving complex logic, which leads to poor accuracy of digital assistants in handling complex tasks.

SUMMARY

In a first aspect of the present disclosure, a method for managing a workflow is provided in an application environment for creating a digital assistant. In this method, in response to receiving a creation request, a page for creating the workflow is presented. The workflow is used for defining a plurality of sequential operations in a predetermined task. The page comprises: a first region for providing a plurality of nodes, and a second region for providing a content of the workflow. The plurality of nodes comprises a model node for calling a machine learning model. In response to receiving an interaction request for the page, the workflow is managed based on the interaction request.

In a second aspect of the present disclosure, an apparatus for managing a workflow is provided in an application environment for creating a digital assistant. The apparatus comprises: a presentation module configured to, in response to receiving a creation request, present a page for creating the workflow, the workflow being used for defining a plurality of sequential operations in a predetermined task, the page comprising: a first region for providing a plurality of nodes, and a second region for providing a content of the workflow, the plurality of nodes comprising a model node for calling a machine learning model; and a management module configured to, in response to receiving an interaction request for the page, manage the workflow based on the interaction request.

In a third aspect of the present disclosure, an electronic device is provided. The electronic device includes: at least one processing unit; and at least one memory, the at least one memory being coupled to the at least one processing unit and storing instructions for execution by the at least one processing unit, the instructions, when executed by the at least one processing unit, causing the electronic device to perform the method according to the first aspect of the present disclosure.

In a fourth aspect of the present disclosure, there is provided a computer readable storage medium having stored thereon a computer program that, when executed by a processor, causes the processor to implement the method according to the first aspect of the present disclosure.

In a fifth aspect of the present disclosure, a method for creating a digital assistant is provided. In the method, a page for creating the digital assistant is presented. In response to receiving an adding request in the page, a management page for adding a workflow to the digital assistant is presented. The workflow is used to define a plurality of sequential operations in a predetermined task. The management page includes: a first region for providing a plurality of nodes, and a second region for providing a content of the workflow. The plurality of nodes include a model node for calling a machine learning model. In response to receiving an interaction request for the management page, the workflow is managed based on the interaction request.

It should be understood that the contents described in this section are not intended to limit the key features or important features of the present disclosure, nor are they intended to limit the scope of the disclosure. Other features of the disclosure will become readily understood from the following description.

BRIEF DESCRIPTION OF THE DRAWINGS

In the following text, the above and other features, advantages, and aspects of each embodiment of the present disclosure will become more apparent in conjunction with the accompanying drawings and with reference to the following detailed description. In the drawings, the same or similar reference numerals indicate the same or similar elements, where.

DETAILED DESCRIPTION

Figure 1:
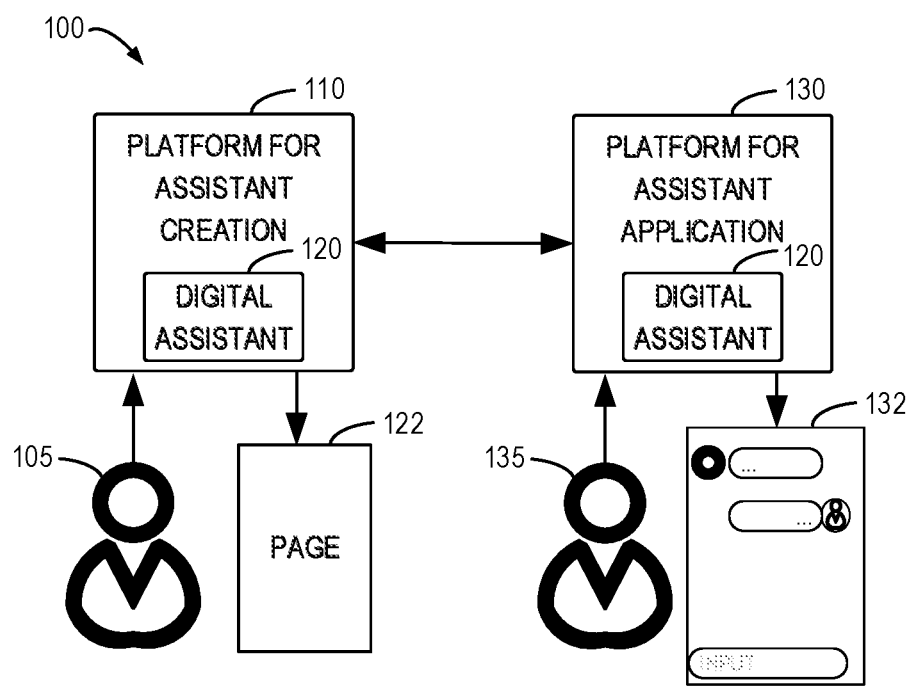
FIG. 1 illustrates a block diagram of an example application environment.

Embodiments of the present disclosure will be described in more detail below with reference to the accompanying drawings. Although some embodiments of the present disclosure are shown in the drawings, it would be appreciated that the present disclosure can be implemented in various forms and should not be interpreted as limited to the embodiments described herein. On the contrary, these embodiments are provided for a more thorough and complete understanding of the present disclosure. It would be appreciated that the drawings and embodiments of the present disclosure are only for illustrative purposes and are not intended to limit the scope of protection of the present disclosure.

In the description of the embodiments of the present disclosure, the term "including" and similar terms should be understood as open-ended inclusion, that is, "including but not limited to". The term "based on" should be understood as "at least partially based on". The terms "one embodiment" or "the embodiment" should be understood as "at least one embodiment". The term "some embodiments" should be understood as "at least some embodiments". The following may also include other explicit and implicit definitions.

Unless expressly stated, performing a step "in response to A" does not mean that the step is performed immediately after "A", but may include one or more intermediate steps.

It is to be understood that data involved in the present technical solution (including but not limited to the data itself, the acquisition, use, storage or deletion of the data) should comply with requirements of corresponding laws and regulations and relevant rules.

It is to be understood that, before applying the technical solutions disclosed in various embodiments of the present disclosure, the relevant user should be informed of the type, scope of use, and use scenario of the personal information involved in the subject matter described herein in an appropriate manner in accordance with relevant laws and regulations, and user authorization should be obtained, wherein the relevant user may include any type of rights subject, such as individuals, enterprises, groups.

For example, in response to receiving an active request from the user, prompt information is sent to the user to explicitly inform the user that the requested operation would acquire and use the user's personal information. Therefore, according to the prompt information, the user may decide on his/her own whether to provide the personal information to the software or hardware, such as electronic devices, applications, servers, or storage media that execute operations of the technical solutions of the subject matter described herein.

As an optional, but non-limiting, embodiment, in response to receiving an active request from the user, the way of sending the prompt information to the user may, for example, include a pop-up window, and the prompt information may be presented in the form of text in the pop-up window. In addition, the pop-up window may also carry a select control for the user to choose to "agree" or "disagree" to provide the personal information to the electronic device.

It is to be understood that the above process of notifying and obtaining the user authorization is only illustrative and does not limit the embodiments of the present disclosure. Other methods that satisfy relevant laws and regulations are also applicable to the embodiments of the present disclosure.

As used in this specification, the term "model" may learn the correlation relationship between corresponding inputs and outputs from training data, so that corresponding outputs may be generated for given inputs after training. The generation of the model may be based on machine learning technology. Deep learning is a machine learning algorithm that processes inputs and provides corresponding outputs by using a plurality of layers of processing units. Neural networks models are an example of deep learning-based models. The term, "model" may also be referred to as "machine learning model", "learning model", "machine learning network", or "learning network", and these terms are used interchangeably herein.

Digital assistants may serve as effective tools for people's work, study, and life. Typically, the development of digital assistants is similar to the development of general applications, requiring developers with programming skills to define the various capabilities of digital assistants by writing complex code and deploying them on appropriate operating platforms so that users may download, install, and use digital assistants.

With the diversification of application scenarios and the increasing availability of machine learning technology, more digital assistants may be developed with different capabilities to support task processing in various subdivisions or meet the personalized needs of different users. However, because of limitations in the individual programming capabilities and limited understanding of the underlying implementation logic of digital assistants, users cannot freely and conveniently create different digital assistants. Therefore, this specification describes technologies configured to provide a more convenient and flexible way to create digital assistants, allowing more users to configure the digital assistants they want.

Example Environment

By providing a modular, simple and freely input digital assistant creation scheme, users may easily and quickly define digital assistants with different capabilities without requiring coding skills.

FIG. 1 illustrates a block diagram of an application environment 100 in which an embodiment of the present disclosure may be implemented. The environment 100 relates to a platform for assistant creation 110 and a platform for assistant application 130.

As shown in FIG. 1, the platform for assistant creation 110 may provide a digital assistant creation and publishing environment for a user 105. In some embodiments, the platform for assistant creation 110 may be a low-code platform that provides a collection of tools for digital assistant creation. The platform for assistant creation 110 may support visual development of digital assistants, allowing developers to skip the manual coding process, accelerate the development cycle and reduce the cost of applications. The platform for assistant creation 110 may support any suitable platform for users to develop digital assistants and other types of applications, such as platforms based on application platform as a service (aPaaS). Such a platform may support users to efficiently develop applications, achieve application creation, application functionality adjustment, and other operations.

The platform for assistant creation 110 may be deployed locally on a terminal device of the user 105 and/or may be supported by a remote server. For example, the terminal device of the user 105 may run a client (e.g., an application) in communication with the platform for assistant creation 110, which may support the user's interaction with the platform for assistant creation 110. In the case where the platform for assistant creation 110 runs locally on the user's terminal device, the user 105 may directly use the client to interact with the local platform for assistant creation 110. In the scenario where the platform for assistant creation 110 runs on a server device, the server device may provide services to the client running on the terminal device based on the communication connection with the terminal device. The platform for assistant creation 110 may present a corresponding page 122 to the user 105 based on the operation of the user 105 to output and/or receive information from the user 105.

In some embodiments, the platform for assistant creation 110 may be associated with a corresponding database that stores data or information required for the digital assistant creation process supported by the platform for assistant creation 110. For example, the database may store code and descriptive information corresponding to various functional modules that constitute the digital assistant. The platform for assistant creation 110 may also perform operations such as calling, adding, deleting, updating, etc. on the functional modules in the database. The database may also store operations that may be performed on different functional modules. Illustratively, in a scenario where an application is to be created, the platform for assistant creation 110 may call corresponding functional blocks from the database to build the application.

In some embodiments of the present disclosure, the user 105 may create and publish the digital assistant 120 on the platform for assistant creation 110 as needed. The digital assistant 120 may be published to any suitable platform for assistant application 130 as long as the platform for assistant application 130 may support the running of the digital assistant 120. After publication, the digital assistant 120 may be used for conversational interaction with the user 135. The client of the platform for assistant creation 110 may present an interaction window 132 of the digital assistant 120 in the client interface, such as a conversation window. For example, the client may render a user interface in the terminal device for presenting the interaction window. The digital assistant 120, as an intelligent assistant, has intelligent conversation and information processing capabilities.

The user 140 may input a conversation message in the conversation window. The digital assistant 120 may determine a response message based on the created configuration information and present it to the user in the interaction window 132. In some embodiments, depending on the configuration of the digital assistant 120, the interaction message with the digital assistant 120 may include messages in multiple message formats, such as text messages (e.g., natural language text), voice messages, image messages, video messages, and so on.

The platform for assistant creation 110 and/or the platform for assistant application 130 may run on an appropriate electronic device. The electronic device may be any suitable type of computing-capable device, including a terminal device or a server device. The terminal device may be any suitable type of mobile terminal, fixed terminal, or portable terminal, including mobile phones, desktop computers, laptop computers, notebook computers, netbook computers, tablet computers, media computers, multimedia tablets, personal communication system (PCS) devices, personal navigation devices, personal digital assistants (PDAs), audio/video player, digital cameras/camcorders, positioning devices, television receivers, radio broadcast receivers, electronic book devices, gaming devices, or any combination of the foregoing, including accessories and peripherals of these devices, or any combination thereof. Server devices may include, for example, computing systems/servers, such as mainframes, edge computing nodes, computing devices in cloud environments, and the like. In some embodiments, the platform for assistant creation 110 and/or the platform for assistant application 130 may be implemented based on cloud services.

It should be understood that the structure and functionality of environment 100 are described for illustrative purposes only, without implying any limitation on the scope of the present disclosure.

The platform for assistant creation 110 may obtain interaction information between the user 140 and the digital assistant 120 in the conversation window (including conversation messages from the user and response messages from the digital assistant 120). In some embodiments, the platform for assistant creation 110 may use the model to understand the user's conversation messages and determine the next steps to be performed. The platform for assistant creation 110 may interact with the model to provide model input to the model and obtain corresponding model output from the model. The model may run locally on the platform for assistant creation 110 or on a remote server. In some embodiments, the model may be a machine learning model, a deep learning model, a learning model, neural networks, etc. In some embodiments, the model may be based on a language model (LM), especially a large language model (LLM). The language model may have question-answer capabilities by learning from a large amount of corpus. The model may also be based on other appropriate models.

Digital assistants usually cannot handle tasks involving complex logic, which leads to unsatisfactory accuracy in handling complex tasks. Currently, there are modular ways to define operation sequences. However, currently only pre-developed functional modules may be called, or new functional modules may be developed by oneself, which requires writing code and is not practical for users who lack basic programming knowledge. This specification describes technologies to provide a more flexible and effective way to develop new functionality in the platform for assistant creation 110.

Summary of Managing Workflow

In order to at least partially solve the drawbacks in existing solutions, according to some embodiments of the present disclosure, a method for managing a workflow is proposed in an application environment of creating a digital assistant. Specifically, workflows may be used in the platform for assistant creation 110 to provide new functionality. In summary, workflows may define a plurality of sequential operations in predetermined tasks, and each sequential operation may be implemented based on modular ways to complete predetermined tasks. According to an exemplary embodiment of the present disclosure, the powerful processing power of the machine learning model is allowed to be called in the workflow to complete predetermined tasks. In this way, the complexity of the digital assistant 120 may be reduced, thereby reducing the development difficulty.

Figures 2, 3:
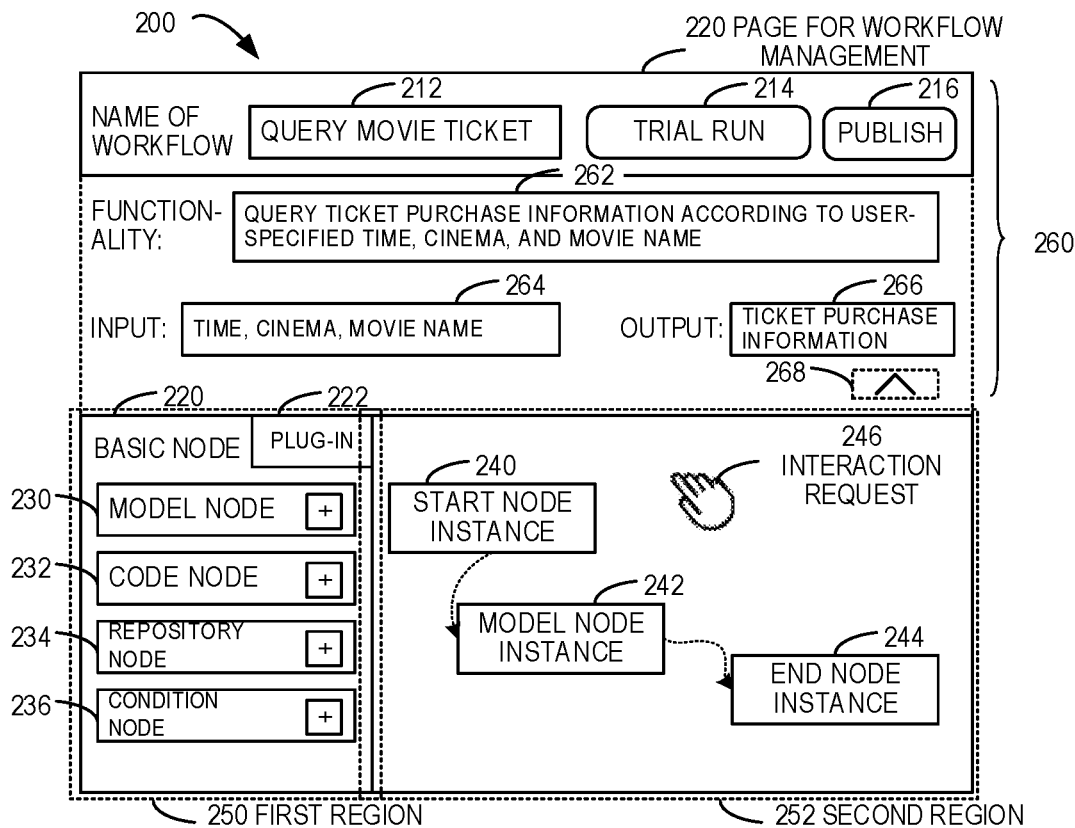
FIG. 2 illustrates a block diagram of an example of managing a workflow.
FIG. 3 illustrates a block diagram of an example start node instance in a workflow.

Referring to FIG. 2, a summary of an exemplary embodiment of the present disclosure is described, which illustrates a block diagram 200 for managing a workflow according to some embodiments of the present disclosure. As shown in FIG. 2, a page for workflow management 220 may be provided in the platform for assistant creation 110. Specifically, a user request may be detected in the platform for assistant creation 110, and the page 220 for creating a workflow may be presented in response to receiving a creation request. For example, a control (e.g., a menu, a button, etc.) may be provided for initiating the page for workflow management 220, and the creation request may be detected based on user interaction with the control.

In FIG. 2, the page for workflow management 220 may include a plurality of regions. For example, in an upper region 260 of the page for workflow management 220, a name of a workflow may be presented, and the user may input the name of the workflow in a control of field 212. A control 214 may provide a trial run function, and the user may execute, e.g., press, the control 214 to run the created workflow and test whether the running results meet expectations. A control 216 may provide a publish function, for example, the user may execute the control 216 to publish the created workflow in the platform for assistant creation 110 or integrate the created workflow into the digital assistant 120 currently being created, and so on.

According to some implementations of the present disclosure, the upper region 260 may present descriptive information about the workflow. For example, the functionality of the workflow may be presented at a control or field 262, the input data of the workflow may be presented at a control or field 264, the output data of the workflow may be presented at a control or field 266, and so on. Further, the user may execute a control 268 to fold or collapse the descriptive information shown in the dashed box in the upper region 260. In this way, the two lower regions may be displayed in a larger range, making it easier for user interaction.

Further, the lower part of the page for workflow management 220 may include: a first region 250 located on the left and a second region 252 located on the right. Specifically, the first region 250 may provide a plurality of different types of nodes that may be added to the workflow. It should be understood that a plurality of nodes here may include nodes for calling machine learning models (such as a model node 230 in FIG. 2). In this way, the workflow is allowed to call the powerful processing power of machine learning models to complete the expected functionality, thereby reducing the development complexity and workload locally in the workflow.

On the right side of the first region 250, the second region 252 for providing content for the workflow may be presented. In the initial stage of creating the workflow, the second region 252 may be empty. User interaction requests in the page for workflow management 220 may be continuously detected, and the workflow may be managed based on an interaction request. For example, as adding operations by the user, the second region 252 may gradually present instances of each node added to the workflow (e.g., simply referred to as node instances). In one example, the workflow may include a start node instance 240, an end node instance 244, and one or more intermediate node instances between the start node instance 240 and the end node instance 244 (e.g., a model node instance 242 corresponding to the model node 230).

According to an example embodiment of the present disclosure, a default initial workflow may be provided when the user creates the workflow, and at this time the second region 252 may present each node instance in the default initial workflow. For example, the default initial workflow may include necessary node instances (such as the start node instance and end node instance), as well as workflow instances that are usually called (such as model node instances). At this time, the user does not need to manually add these node instances but may adjust them based on the default initial workflow. In this way, the complexity of user operations may be further simplified, thereby improving creation efficiency.

By using the embodiments of the present disclosure, the powerful processing power of the machine learning model may be fully utilized to implement special nodes that call the machine learning model, and then predetermined tasks may be achieved by combining each node. In this way, it is particularly suitable for using workflows when complex functional logic needs to be built, so that functionality with complex functional logic and higher requirements for stability can be developed in a simpler and more effective manner.

Detailed Process for Managing Workflow

The summary of some embodiments of the present disclosure has been described. In the following, further details of the page for workflow management 220 are described with reference to FIG. 2. In the context of the present disclosure, "managing workflows" may take various forms. For example, the page for workflow management 220 may be used to create new workflows, or the page may be used to open and modify existing workflows. As shown in FIG. 2, the first region 250 may include two tabs 220 and 222. When the user interacts with (e.g., presses) the tab 220, a plurality of different types of base nodes may be presented in the first region 250, such as the model node 230, a code node 232, a repository node 234, and a condition node 236, etc.

According to an example embodiment of the present disclosure, the model node 230 may call a machine learning model. For example, the user may build a suitable prompt and input it into the machine learning model, and then obtain a response from the machine learning model. The code node 232 may use programming code to provide the functionality of the code node. For example, the user may use a supported programming language to write code. The repository node 234 may provide the functionality of the code node based on a search for the repository. For example, the user may define search details in such nodes to find the expected answer. The conditional node 236 may provide the functionality of the conditional node based on a conditional judgment. For example, the user may determine whether a predetermined condition is met and output a corresponding judgment result.

Further, when the user presses the tab 222, a plug-in node may be presented in the first region 250, that is, one or more plug-ins that have been loaded into the digital assistant. The plug-in node may call the plug-in loaded into the digital assistant to provide the functionality of the plug-in node. The plug-in here may be various plug-ins currently available and/or custom plug-ins that implement the expected functionality according to the plug-in format, etc. For example, plug-ins include: plug-ins for calling search engines to perform searches, plug-ins for image processing, plug-ins for searching academic articles, and so on.

It should be understood that nodes may be considered as "functional blocks" used to implement one or more basic functionality, thereby allowing users to use a plurality of "functional blocks" to achieve expected functionality. Using the example embodiments of the present disclosure, a plurality of types of nodes may be inserted into the workflow, making it easier for users to use richer development methods to achieve expected functionality.

According to an example embodiment of the present disclosure, the workflow may by default include the start node instance 240 corresponding to a start position of the workflow and the end node instance 244 corresponding to an end position of the workflow, respectively. Alternatively, and/or additionally, the user may add the start node instance 240 and the end node instance 244 to the workflow themselves.

According to some embodiments of the present disclosure, a user's selection request for a target node among a plurality of nodes may be detected, and a target node instance corresponding to the target node may be added to the workflow when the selection request is detected. For example, the user may add the target node instance through a right-click menu. Specifically, when the user's input focus is in the second region 252, the right-click of the input device (such as a mouse, etc.) may be clicked to select the expected node type in the pop-up menu. For example, the user may select "start node" and "end node" from the menu to add the start node instance 240 and end node instance 244 to the workflow. Alternatively, and/or additionally, nodes may be inserted into the workflow in other ways, such as dragging a node in the first region 250 to the second region 252 or clicking the "+" in the first region 250 to complete the adding process.

It should be understood that the second region 252 is used to present specific content in the workflow, and thus the second region 252 will be updated substantially synchronously with the change of node instances in the workflow. Using the example embodiments of the present disclosure, each node instance in the workflow may be presented substantially in real time, thereby making it easier for users to fully grasp various information of the workflow.

According to an example embodiment of the present disclosure, the start node instance 240 and the end node instance 244 are, respectively, used to define an input/output interface between the workflow and the outside world. At this time, users may be allowed to add interfaces for data exchange with the outside world to each node instance. For example, users may add one or more input ends to the start node instance 240 (for example, each input end may correspond to an input parameter). For example, in response to receiving an adding request (for example, referred to as a first adding request for ease of differentiation), at least one input end is added to the target node instance, and at least one input end is used to specify at least one input data to be input to the target node instance.

Further details about the start node instance 240 are described with reference to FIG. 3, which illustrates a block diagram 300 of an example start node instance in a workflow according to some embodiments of the present disclosure. As shown in FIG. 3, a settings page 340 may be provided to set the specific contents of the start node instance 240, and a summary 310 may represent general information about the start node instance 240, such as the name "start" and the main functionality of the node instance. Further, a control 320 may be provided to add new input parameters to the start node instance 240. The user may use the control 320 to add one or more input parameters. In one example scenario, the workflow is used to query ticket information about a given movie that was shown at a given cinema on a given date, the input parameters may include, for example, "movie_name", "cinema_name", and "movie_date". The user may press a control 330 to delete one or more input parameters from the start node instance.

Further, a corresponding editing dialog box may be provided for each input parameter to set the corresponding variable name, variable type, and variable description, etc. In the example of FIG. 3, the variable name of the input parameter "movie_date" may be "movie_date", the variable type may be "String", and the variable description may represent "which day do you want to query movie tickets". Similarly, the variable name of the input parameter "movie_name" may be "movie_name", the variable type may be "String", and the variable description may represent "which movie do you want to query for movie tickets"; the variable name of the input parameter "cinema_name" may be "cinema_name", the variable type may be "String", and the variable description may represent "which cinema do you want to query about movie tickets".

With the embodiments of the present disclosure, the user may be allowed in a more convenient and efficient manner to add one or more input parameters to the node instance. In this way, relevant information for each target that is expected to be met may be defined in the start node instance 240.

According to an example embodiment of the present disclosure, an output end may be added to the end node instance 244 in a similar manner. Specifically, an adding request from a user for adding an output end may be detected (e.g., referred to as a second adding request for ease of differentiation). In response to receiving the second adding request, at least one output end is added to the target node instance, and at least one output end is used to specify at least one output data of the target node instance.

Figure 4:
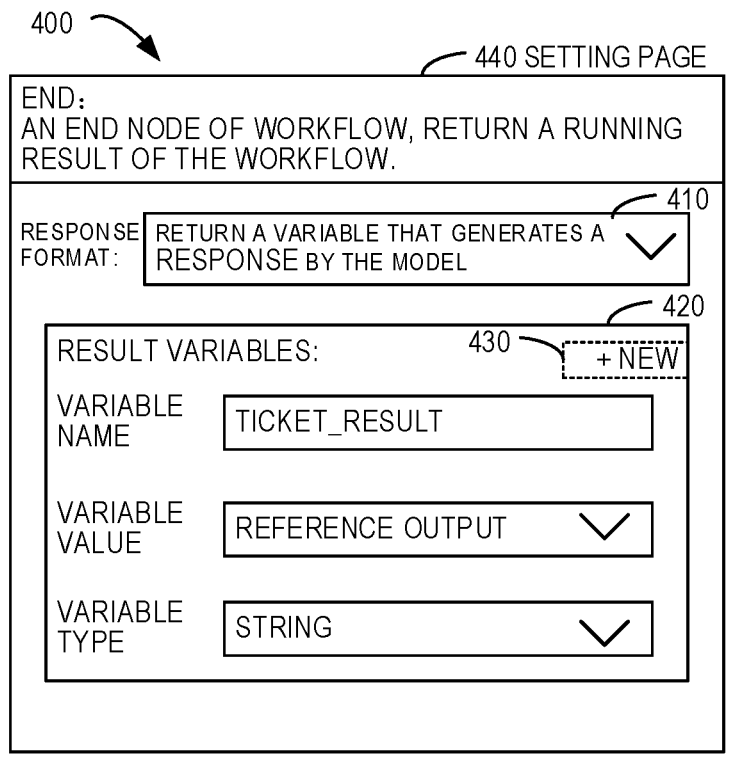
FIG. 4 illustrates a block diagram of an example end node instance in a workflow.

More details about the end node instance 244 are described with reference to FIG. 4, which illustrates a block diagram 400 of an example end node instance in a workflow according to some embodiments of the present disclosure. As shown in FIG. 4, a settings page 440 may be provided to set the specific contents of the start node instance 240, an expected answer format may be specified at a control 410, and various parameters of the result variable may be specified at a control 420, such as variable name, variable value, variable type, etc. Alternatively, and/or additionally, more output parameters may be added via a control 430.

Figure 5:
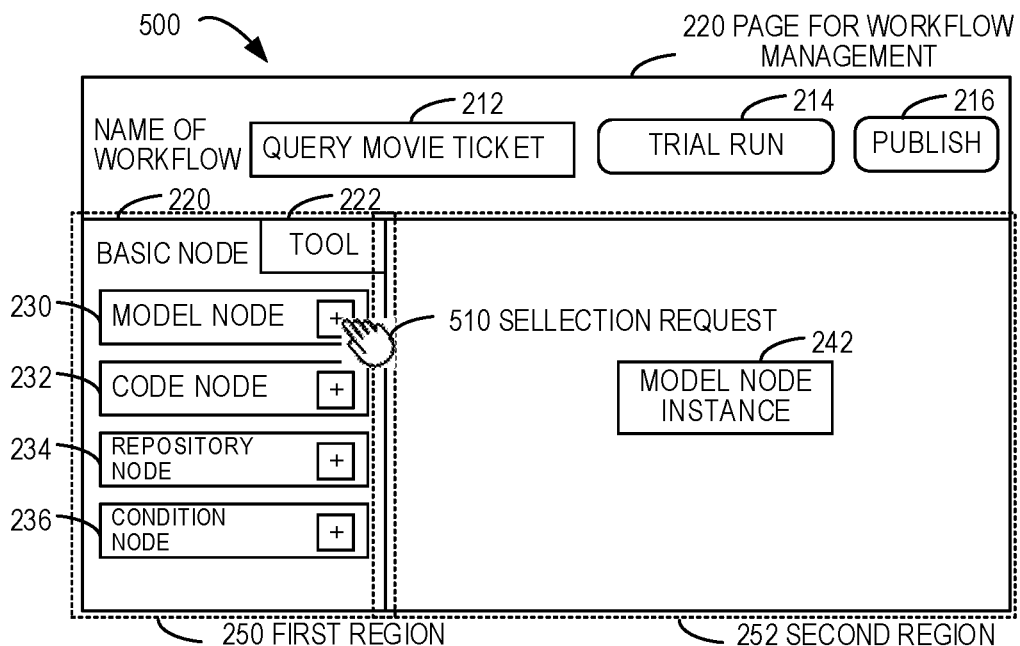
FIG. 5 illustrates a block diagram of an example of adding a node instance to a workflow.

It should be understood that although FIGS. 4 and 5 describe the adding of input and output ends to each node instance with the start node instance and the end node instance as specific examples, alternatively and/or additionally, one or more input ends and one or more output ends may be added in a similar manner for other intermediate node instances between the start node instance and the end node instance.

According to some embodiments of the present disclosure, a selection request may be presented in different forms. Referring to FIG. 5 for more details, which illustrates a block diagram 500 of an example for adding a node instance to a workflow according to some embodiments of the present disclosure. As shown in FIG. 5, the user may select an expected target node from the first region 250 and drag the selected target node to the second region 252 to add a target node instance corresponding to the target node to the workflow. For example, the user may click on the model node 230 and drag it to the second region 252. At this time, the workflow will include the model node instance 242. Alternatively, and/or additionally, the user may click on the "+" on the right of the model node 230 to add the model node instance 242 corresponding to the model node 230 to the workflow. Other nodes may be added to the workflow in a similar manner.

Figure 6:
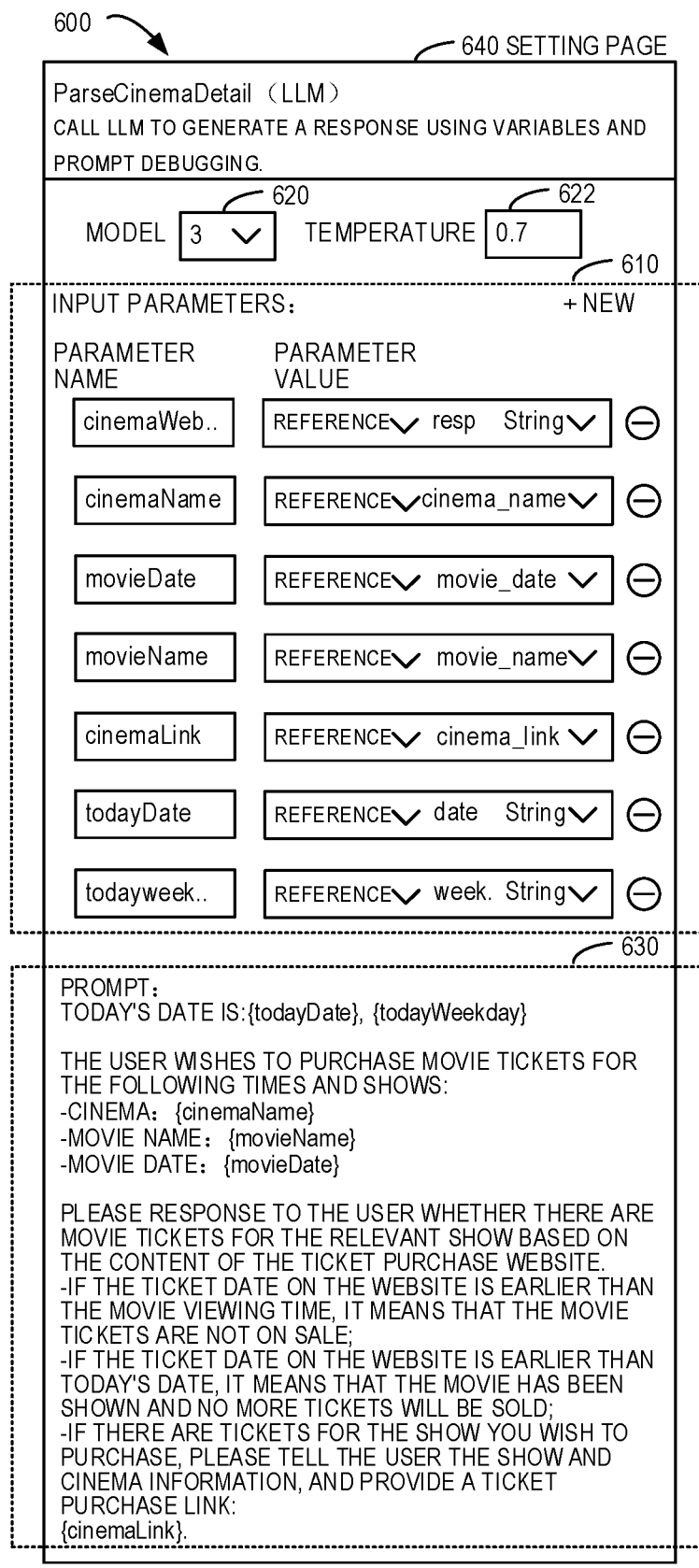
FIG. 6 illustrates a block diagram of an example model node instance in a workflow.

After the model node instance 242 has been added to the workflow, the input and/or output ends may be added to the model node instance 242. Referring to FIG. 6 for more details, which illustrates a block diagram 600 of an example model node instance in a workflow according to some embodiments of the present disclosure. As shown in FIG. 6, the name of the model node instance "ParseCinemaDetail" may be set, and a particular model such as a LLM may be called to implement the node instance.

As shown in FIG. 6, a setting page 640 may be provided to interact with the user. A plurality of input parameters may be set in a region 610 in a similar manner as described above. For example, the parameter "cinema Web" may represent a home page of the cinema, the parameter "cinemaName" may represent a name of the cinema, the parameter "movieDate" may represent an expected query date, the parameter "movieName" may represent a name of the movie, the parameter "cinemaLink" may represent a link to the cinema, the parameter "todayDate" may represent today's date, the parameter "today Week" may represent today's day of the week, and so on. The "reference" in the parameter value represents that the input refers to a parameter defined in the upstream node.

According to an example embodiment of the present disclosure, the relevant parameters of the machine learning model may be set based on an interaction with the settings page 640. Specifically, in response to receiving a settings request for setting parameters of the machine learning model, the parameters may be set based on the settings request, and the parameters include at least one of: an identifier of the machine learning model, temperature information of the machine learning model, or a prompt input for being provided to the machine learning model.

Referring to FIG. 6 for more details, the user may set the identifier of the model via a control 620, that is, select which model to be called in the workflow; the user may set the temperature parameter of the machine learning model via a control 622; further, the user may set the prompt to be provided to the machine learning model at a region 630. In the prompt, the specific information in each parameter is determined via parameters in other node instances upstream of the model node instance. Specifically, assuming that the current date determined by the upstream node instance is Thursday, then the "todayDate" in the prompt will be replaced with "Thursday".

Although FIG. 6 describes the specific details of setting each parameter in the node instance using model node instances as specific examples, alternatively and/or additionally, each parameter in other intermediate node instances may be determined in a similar manner. For example, other intermediate node instances may include one or more input ends for receiving input from the starting node instance and/or output from other upstream node instances. Another example is that other intermediate node instances may include one or more output ends for providing input data to other downstream node instances. In this way, parameters in each instance node may be defined in a more flexible and efficient manner, thereby completing the creation of the workflow.

Figure 7:
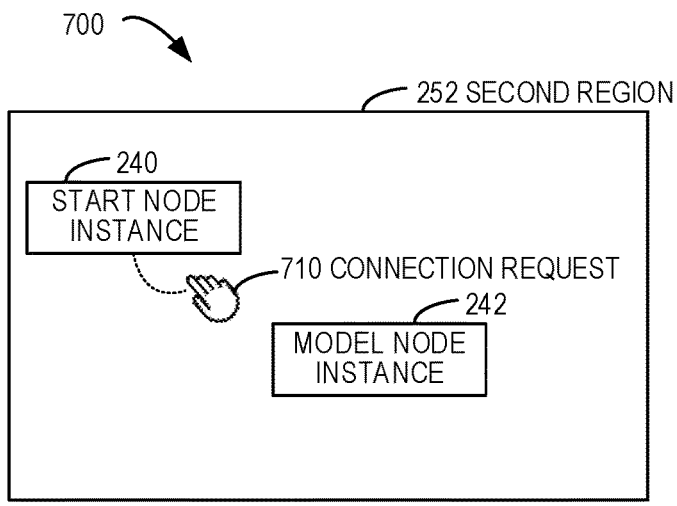
FIG. 7 illustrates a block diagram of an example of establishing a connection relationship between different node instances.

According to some embodiments of the present disclosure, connection relationships between each node instance may be set based on a connection request. Specifically, for the first node instance and the second node instance in the workflow, the connection request between two node instances may be detected. Referring to FIG. 7 for more details, which illustrates a block diagram 700 of an example for establishing a connection relationship between different node instances according to some embodiments of the present disclosure. As shown in FIG. 7, in the second region 252, a connection request 710 from the user between two node instances may be detected. According to an example embodiment of the present disclosure, the connection request 710 may be defined in various ways, such as detecting a connection operation of a user's mouse between two node instances, and so on.

If a connection request is detected between at least one output end of the starting node instance 240 (referred to as a first node instance for easy differentiation) and at least one input end of the model node instance 242 (referred to as a second node instance for easy differentiation), a connection relationship may be presented between the output end and the input end. In other words, the data at the output end of the first node instance may be provided to the input end of the second node instance. Using the example embodiments of the present disclosure, the data transfer relationship between each node instance may be defined in a simple and effective manner. In this way, it is easy to implement a development mode based on functional blocks, thereby reducing the complexity of user operations.

According to an example embodiment of the present disclosure, a plurality of node instances may be added to the workflow in the manner described above, and data transfer relationships between each node instance may be defined. Specifically, for the workflow of querying movie tickets, a workflow 830 shown in FIG. 8 may be created based on an interaction request between the user and the platform for assistant creation 110.

Figure 8:
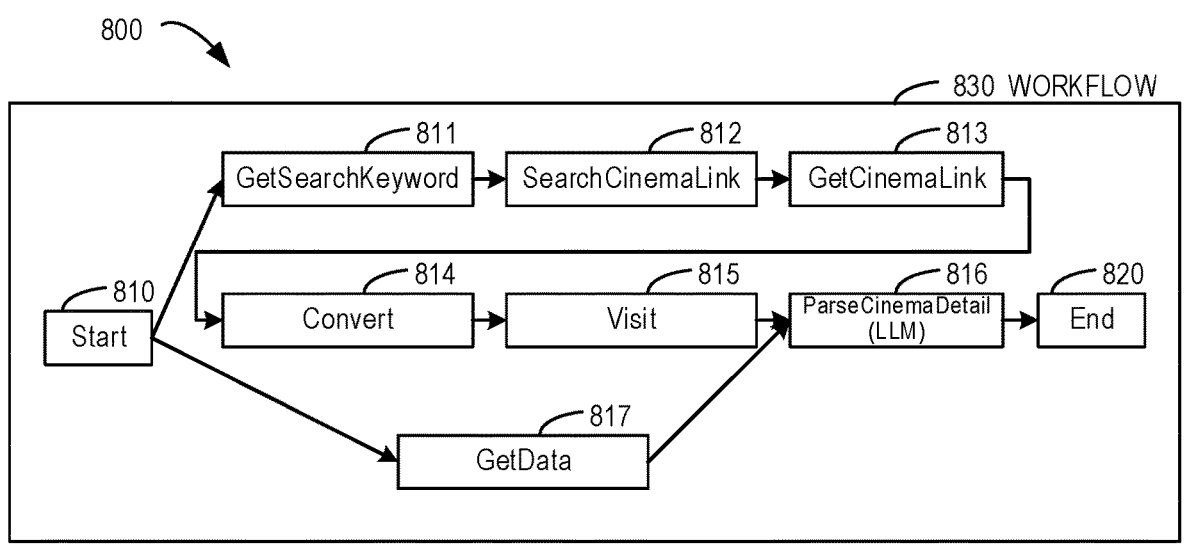
FIG. 8 illustrates a block diagram of an example workflow including a plurality of node instances.

FIG. 8 illustrates a block diagram 800 of an example workflow including a plurality of node instances according to some embodiments of the present disclosure. As shown in FIG. 8, the workflow 830 may include a start node instance 810 (named Start), an end node instance 820 (named End), and a plurality of intermediate node instances. Specifically, a node instance 811 (named GetSearchKeyword) may obtain search keywords and correspond to the code node; a node instance 817 (named GetData) may obtain data and correspond to the code node; a node instance 812 (named SearchCinemaLink) may search for a link to a cinema and correspond to the plug-in node; a node instance 813 (named GetCinemaLink) may obtain a link to the cinema and correspond to the code node; a node instance 814 (named Convert) may obtain an actual link address of the cinema and correspond to the code node; a node instance 815 (named Visit) may access a link address of the cinema and correspond to the plug-in node; a node instance 816 (named ParseCinemaDetail) may parse detailed information about the cinema and correspond to the model node.

With the example embodiments of the present disclosure, the user may create the workflow 830 with simple input, drag and drop, and connection operations, and use the workflow 830 to query information about a given movie to be shown in a given cinema on a given date. In this way, the efficiency of users in creating a workflow may be improved, and a machine learning model with powerful processing capabilities may be fully utilized to complete tasks with complex logical relationships.

According to an example embodiment of the present disclosure, after the workflow 830 has been successfully created, the created workflow 830 may be run and tested. In response to receiving a test request for testing the workflow, at least one input data of the workflow may be received. Specifically, the user may click on the control 214 shown in FIG. 2 to start a testing process. At this time, a page shown in FIG. 9 may be presented, which illustrates a block diagram 900 of an example for setting input data of a workflow according to some embodiments of the present disclosure.

In a trial running page, the user may specify three input data defined in the workflow 830. For example, the expected movie name for the query may be input at box 920, the expected cinema name may be input at box 930, the expected date for the query may be input at box 940, and the input data may be submitted through a control 950. At this time, the workflow 830 will be executed and used to search for ticket information for a movie "ABC *" to be shown at the cinema "XYZ *" this weekend.

During the testing process, relevant state data for each node instance in the workflow may be provided to the user. For example, the user may double-click on the expected node instance to obtain relevant state data; alternatively, and/or additionally, relevant state data may be provided when the user's mouse hovers over a node instance, etc. It should be understood that the state data here may include at least one of: data for at least one input end of the target node instance, data for at least one output end of the target node instance, or an execution state of whether the target node instance is successfully executed or not.

Figures 9, 10:
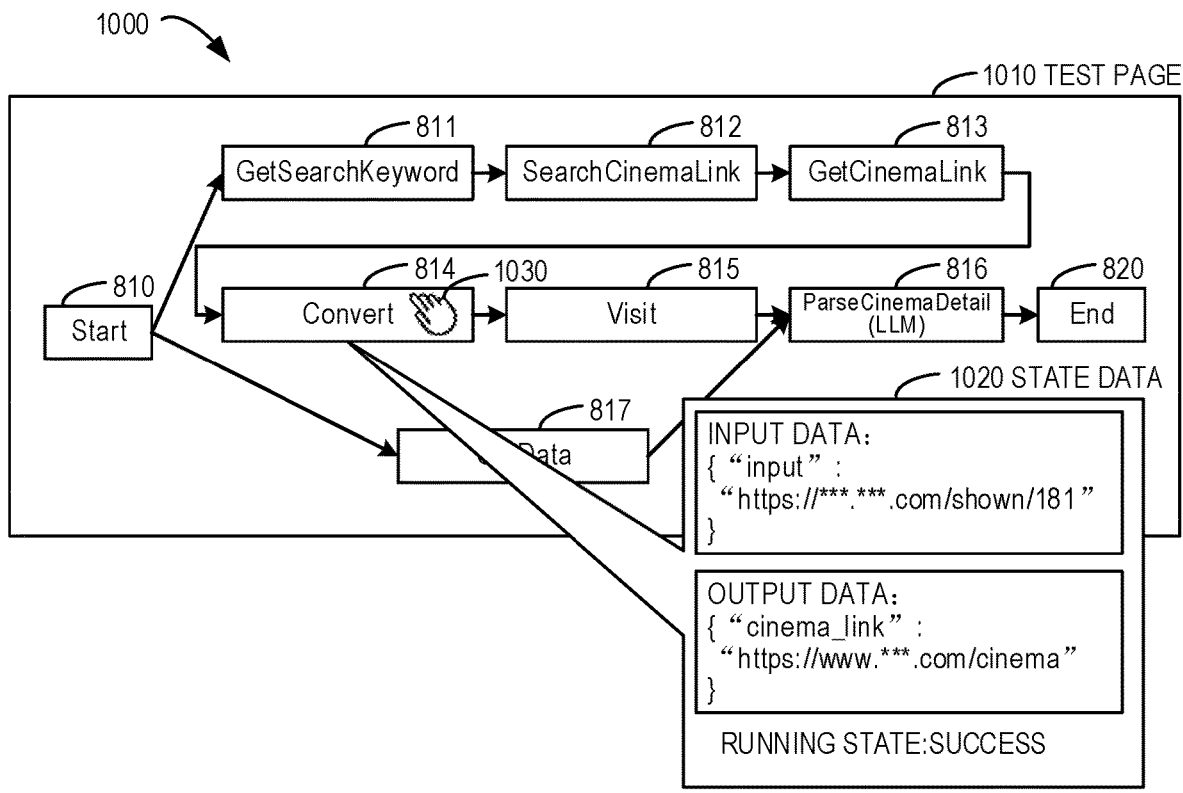
FIG. 9 illustrates a block diagram of example input data for setting a workflow.
FIG. 10 illustrates a block diagram of an example of testing a workflow.

FIG. 10 illustrates a block diagram 1000 of an example for testing and/or debugging a workflow according to some embodiments of the present disclosure. As shown in FIG. 10, in a test page 1010, if a user interaction 1030 with the node instance 814 is detected, state data 1020 may be provided. The state data 1020 may include specific numerical values of input and output data defined in the node instance. Alternatively, and/or additionally, the state data 1020 may further include an operating state "success" of the node instance 814. Alternatively, and/or additionally, each node instance may be presented in a visual format (e.g., different colors). For example, a node instance with a running state of "success" may be presented in green, and a node instance with a running state of "failure" may be presented in red. In this way, rich testing information may be provided to users in a visual manner, making it easy for users to modify potential errors in the workflow.

According to an example embodiment of the present disclosure, for the model node instance, at least one of the following may be further presented: a prompt input provided to the machine learning model, a response to prompt input from the machine learning model. For example, a prompt input for the node instance 816 used to call the machine learning model may be similar to the content shown in the region 630 in FIG. 6, in which each parameter has been replaced with data obtained from the upstream module. Another example is that the response of the machine learning model to the prompt input may include: "this weekend, the movie 'ABC *' will be shown at the cinema 'XYZ *', and the ticket information is as follows . . . ". In this way, rich testing information may be provided to users, making it easy for them to modify potential errors in the workflow.

According to an example embodiment of the present disclosure, the user may publish the generated workflow. At this time, a user's publishing request may be detected. In response to detecting the publishing request, the workflow is published in the platform for assistant creation 110. At this time, a specific user in the platform for assistant creation 110 (such as a user with access to the published workflow) may access the workflow and integrate it into their own digital assistant. Alternatively, and/or additionally, the user may directly integrate the workflow into the digital assistant currently being created. In this way, it is easy to use the workflow to complete tasks with complex logic, thereby improving the efficiency of creating digital assistants.

According to some embodiments of the present disclosure, a method for creating a digital assistant is provided to allow the user to integrate the created workflow with a digital assistant during the creation of the digital assistant. Specifically, a page for creating the digital assistant may be presented in the platform for assistant creation 110, and controls for adding workflows to the digital assistant may be provided on the page. When it is detected that the user calls the control, it may be determined that an adding request has been received, and at this time, a management page for adding the workflow to the digital assistant may be presented in the platform for assistant creation 110.

The workflow may define a plurality of sequential operations in a predetermined task, and the management page may include: a first region for providing a plurality of nodes, and a second region for providing a content for the workflow. The plurality of nodes include a model node for calling the machine learning model. In response to receiving an interaction request for the page, the workflow is managed based on the interaction request. In this way, in the process of creating the digital assistant, the process described above may be used to create new workflows, and/or modify existing workflows, and integrate the corresponding workflows into the digital assistant. Thus, workflows may be integrated into the digital assistant in a simple and effective way, thereby enriching the functionality of the digital assistant.

According to one example embodiment of the present disclosure, if the workflow is integrated into the digital assistant, description data of the workflow (e.g., functionality, input data, output data of the workflow, etc.) may be sent as part of a prompt to the machine learning model to inform the machine learning model that the digital assistant has the capability to process the user input using the workflow.

After integration, the digital assistant may call the integrated workflow to process tasks. For example, the digital assistant may receive the user input represented in the natural language and input the prompt generated based on the user input to the model. The model may determine whether the workflow needs to be called. If needed, the workflow will be called to process the user input. For example, in the example of presenting ticket information above, assuming the user input is "I want to see the movie 'ABC *' to be shown at the cinema 'XYZ *' this weekend", the workflow will be called, and relevant ticket information will be presented to the user.

Example Process

Figure 11:
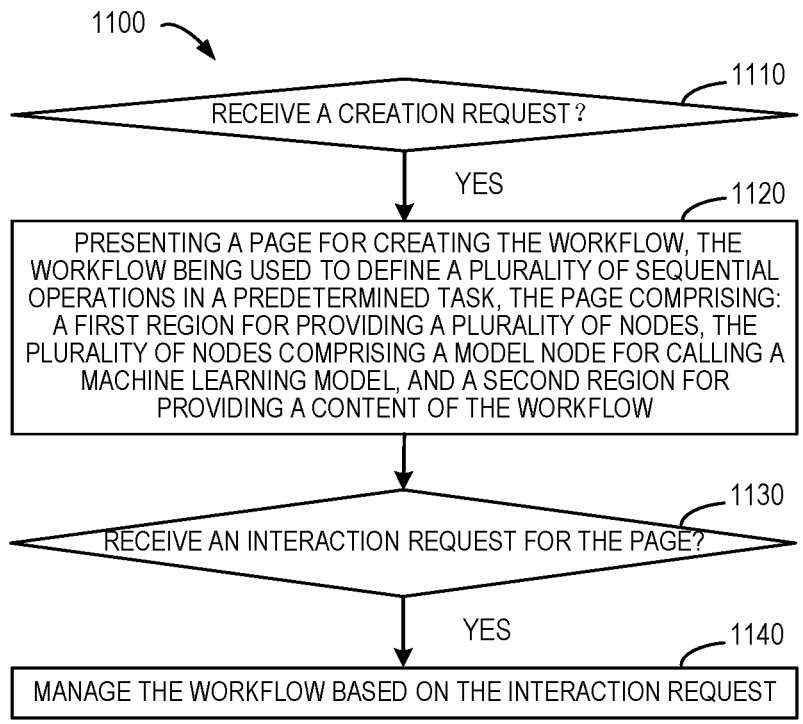
FIG. 11 illustrates a flowchart of an example method for managing a workflow.

FIG. 11 illustrates a flowchart of an example method 1100 for managing a workflow according to some embodiments of the present disclosure. At block 1110, it is determined whether a creation request is received. If the creation request is received, the method 1100 proceeds to block 1120. At block 1120, a page for creating a workflow is presented. The workflow is used to define a plurality of sequential operations in a predetermined task. The page comprises: a first region for providing a plurality of nodes, and a second region for providing a content of the workflow. The plurality of nodes comprises a model node for calling a machine learning model. At block 1130, it is determined whether an interaction request for the page is received. In response to receiving the interaction request, the method 1100 proceeds to block 1140. At block 1140, the workflow is managed based on the interaction request.

According some embodiments of the present disclosure, managing the workflow based on the interaction request comprises: in response to receiving a selection request for a target node of the plurality of nodes, adding a target node instance corresponding to the target node into the workflow; and presenting the target node instance in the second region.

According to some embodiments of the present disclosure, the method 1100 further comprises at least one of: in response to receiving a first adding request, adding, into the target node instance, at least one input end for specifying at least one input data to be input to the target node instance; or in response to receiving a second adding request, adding, into the target node instance, at least one output end for specifying at least one output data of the target node instance.

According to some embodiments of the present disclosure, the method 1100 further comprises: for a first node instance and a second node instance in the workflow, in response to receiving a connection request for connecting an output end of at least one output end of the first node instance and an input end of at least one input end of the second node instance, presenting a connection relationship between the output end and the input end.

According to some embodiments of the present disclosure, the workflow comprises a model node instance corresponding to the model node, and the method further comprises: in response to receiving a setting request for setting relevant parameters of the machine learning model, setting the parameters based on the setting request, the parameters comprising at least one of: an identifier of the machine learning model, temperature information of the machine learning model, or a prompt input for being provided to the machine learning model.

According to some embodiments of the present disclosure, the plurality of nodes further comprises at least one of: a code node for providing functionality of the code node with programming code; a repository node for providing functionality of the repository node based on a search in the repository; a condition node for providing functionality of the condition node based on a conditional judgment; or a plug-in node for calling a plug-in loaded into a digital assistant to provide functionality of the plug-in node, the workflow being integrated in the digital assistant.

According to an example embodiment of the present disclosure, the method 1100 further comprises: in response to receiving a test request for testing the workflow, receiving at least one input data for being provided to the workflow.

According to an example embodiment of the present disclosure, the method 1100 further comprises: providing state data of a target node instance in the workflow, the state data comprising at least one of: data for at least one input end of the target node instance, data for at least one output end of the target node instance, or an execution state of whether the target node instance being successfully executed or not.

According to an example embodiment of the present disclosure, providing the state data of the target node instance further comprises: in response to determining that the target node instance is a model node instance, providing at least one of: a prompt input provided to the machine learning model, or a response to the prompt input from the machine learning mode.

According to an example embodiment of the present disclosure, the method 1100 further comprises: in response to receiving a publish request, publishing the workflow so that the workflow is integrated in a digital assistant.

According to an example embodiment of the present disclosure, a method for creating a digital assistant is provided. In the method, a page for creating the digital assistant is presented. In response to receiving an adding request in the page, a management page for adding a workflow to the digital assistant is presented. The workflow is used to define a plurality of sequential operations in a predetermined task. The management page includes: a first region for providing a plurality of nodes, and a second region for providing a content of the workflow. The plurality of nodes include a model node for calling a machine learning model. In response to receiving an interaction request for the management page, the workflow is managed based on the interaction request.

Example Apparatus and Device

Figure 12:
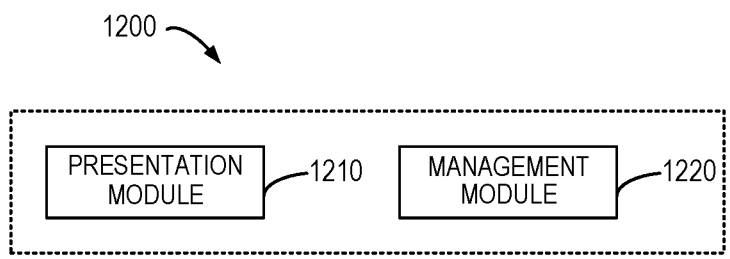
FIG. 12 illustrates a block diagram of an example apparatus for managing a workflow.

FIG. 12 illustrates a block diagram of an example apparatus 1200 for managing a workflow according to some embodiments of the present disclosure. The apparatus 1200 includes: a presentation module 1210 configured to, in response to receiving a creation request, present a page for creating the workflow, the workflow being used for defining a plurality of sequential operations in a predetermined task, the page comprising: a first region for providing a plurality of nodes, and a second region for providing a content of the workflow, the plurality of nodes comprising a model node for calling a machine learning model; and a management module 1220 configured to, in response to receiving an interaction request for the page, manage the workflow based on the interaction request.

According to some embodiments of the present disclosure, the management module includes: an instance adding module configured to, in response to receiving a selection request for a target node of the plurality of nodes, add a target node instance corresponding to the target node into the workflow; and a instance presentation module configured to present the target node instance in the second region.

According to some embodiments of the present disclosure, the apparatus 1200 further comprises: a first adding module configured to, in response to receiving a first adding request, add, into the target node instance, at least one input end for specifying at least one input data to be input to the target node instance; and a second adding module configured to, in response to receiving a second adding request, add, into the target node instance, at least one output end for specifying at least one output data of the target node instance.

According to some embodiments of the present disclosure, the apparatus 1200 further comprises: a connection module configured to, for a first node instance and a second node instance in the workflow, in response to receiving a connection request for connecting an output end of at least one output end of the first node instance and an input end of at least one input end of the second node instance, present a connection relationship between the output end and the input end.

According to some embodiments of the present disclosure, the workflow comprises a model node instance corresponding to the model node, and the apparatus 1200 further comprises: a setting module configured to, in response to receiving a setting request for setting relevant parameters of the machine learning model, set the parameters based on the setting request, the parameters comprising at least one of: an identifier of the machine learning model, temperature information of the machine learning model, or a prompt input for being provided to the machine learning model.

According to some embodiments of the present disclosure, the plurality of nodes further comprises at least one of: a code node for providing functionality of the code node with programming code; a repository node for providing functionality of the repository node based on a search in the repository; a condition node for providing functionality of the condition node based on a conditional judgment; or a plug-in node for calling a plug-in loaded into a digital assistant to provide functionality of the plug-in node, the workflow being integrated in the digital assistant.

According to some embodiments of the present disclosure, the apparatus 1200 further comprises: a receiving module configured to, in response to receiving a test request for testing the workflow, receive at least one input data for being provided to the workflow.

According to some embodiments of the present disclosure, the apparatus 1200 further comprises: a providing module configured to provide state data of a target node instance in the workflow, the state data comprising at least one of: data for at least one input end of the target node instance, data for at least one output end of the target node instance, or an execution state of whether the target node instance being successfully executed or not.

According to some embodiments of the present disclosure, the providing module further includes: a model-based providing module configured to, in response to determining that the target node instance is a model node instance, provide at least one of: a prompt input provided to the machine learning model, or a response to the prompt input from the machine learning model.

According to some embodiment of the present disclosure, the apparatus 1200 further comprises: a publishing module configured to, in response to receiving a publish request, publish the workflow so that the workflow is integrated in a digital assistant.

Figure 13:
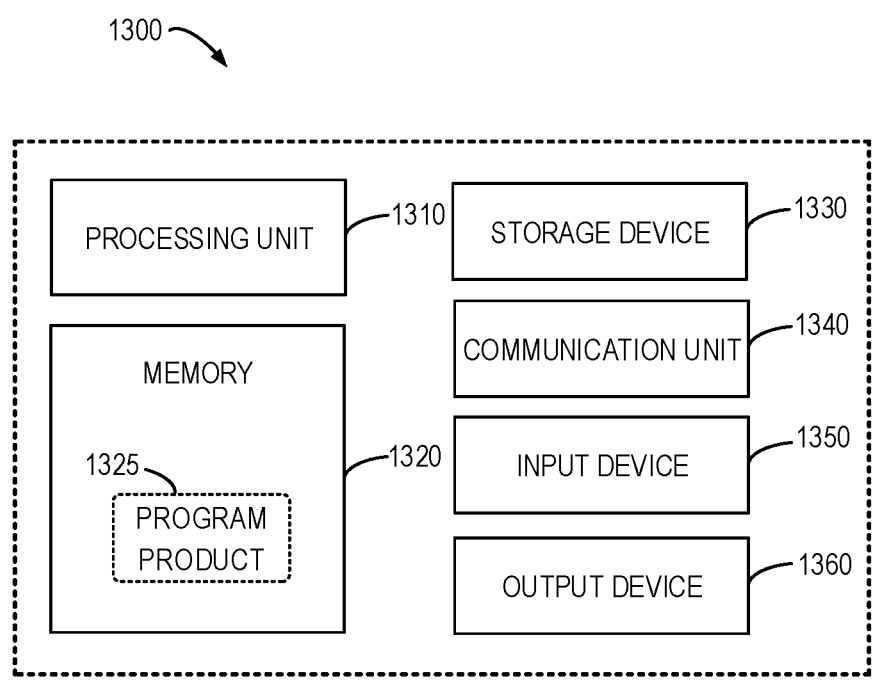
FIG. 13 illustrates a block diagram of an example device.

FIG. 13 illustrates a block diagram of an example device 1300 capable of implementing multiple implementations of the disclosure. It should be understood that the computing device 1300 shown in FIG. 13 is merely an example and should not constitute any limitation on the functionality and scope of the implementations described herein. The computing device 1300 shown in FIG. 13 may be used to implement the methods described above.

As shown in FIG. 13, the computing device 1300 is in the form of a general computing device. The components of computing device 1300 may include, but are not limited to, one or more processors or processing units 1310, a memory 1320, a storage device 1330, one or more communication units 1340, one or more input devices 1350, and one or more output devices 1360. The processing unit 1310 may be an actual or virtual processor and can execute various processes based on the programs stored in the memory 1320. In a multiprocessor system, multiple processing units execute computer executable instructions in parallel to improve the parallel processing capability of the computing device 1300.

The computing device 1300 typically includes multiple computer storage media. Such media may be any available media that is accessible to the computing device 1300, including but not limited to volatile and non-volatile media, removable and non-removable media. The memory 1320 may be volatile memory (for example, a register, cache, a random access memory (RAM)), a non-volatile memory (for example, a read-only memory (ROM), an electrically erasable programmable read-only memory (EEPROM), a flash memory), or any combination thereof. The storage device 1330 may be any removable or non-removable medium, and may include a machine readable medium such as a flash drive, a disk, or any other medium, which may be used to store information and/or data (such as training data for training) and may be accessed within the computing device 1300.

The computing device 1300 may further include additional removable/non-removable, volatile/non-volatile storage medium. Although not shown in FIG. 13, a disk driver for reading from or writing to a removable, non-volatile disk (such as a "floppy disk"), and an optical disk driver for reading from or writing to a removable, non-volatile optical disk may be provided. In these cases, each driver may be connected to the bus (not shown) by one or more data medium interfaces. The memory 1320 may include a computer program product 1325, which has one or more program units configured to execute various methods or acts of various implementations of the present disclosure.

The communication unit 1340 communicates with a further computing device through the communication medium. In addition, functionality of components in the computing device 1300 may be implemented by a single computing cluster or multiple computing machines, which can communicate through a communication connection. Therefore, the computing device 1300 may be operated in a networking environment using a logical connection with one or more other servers, a network personal computer (PC), or another network node.

The input device 1350 may be one or more input devices, such as a mouse, a keyboard, a trackball, etc. The output device 1360 may be one or more output devices, such as a display, a speaker, a printer, etc. The computing device 1300 may also communicate with one or more external devices (not shown) through the communication unit 1340 as required. The external device, such as a storage device, a display device, etc., communicate with one or more devices that enable users to interact with the computing device 1300, or communicate with any device (for example, a network card, a modem, etc.) that makes the computing device 1300 communicate with one or more other computing devices. Such communication may be executed via an input/output (I/O) interface (not shown).

According to the example implementations of the present disclosure, a computer-readable storage medium is provided, on which a computer-executable instruction or computer program is stored, wherein the computer-executable instructions are executed by the processor to perform operations to implement the method described above. According to the example implementations of the present disclosure, a computer program product is also provided. The computer program product is physically stored on a non-transitory computer-readable medium and includes computer-executable instructions, which are executed by the processor to perform operations to implement the method described above. According to the exemplary implementations of the present disclosure, a computer program product is provided having stored thereon a computer program, and when the program is executed by a processor, the method described above is implemented.

Various aspects of the present disclosure are described herein with reference to the flow chart and/or the block diagram of the method, the apparatus, the device and the computer program product implemented in accordance with the present disclosure. It would be appreciated that each block of the flowchart and/or the block diagram and the combination of each block in the flowchart and/or the block diagram may be implemented by computer-readable program instructions.

These computer-readable program instructions may be provided to the processing units of general-purpose computers, specialized computers, or other programmable data processing devices to produce a machine that generates an apparatus to implement the functions/actions specified in one or more blocks in the flow chart and/or the block diagram when these instructions are executed through the computer or other programmable data processing apparatuses. These computer-readable program instructions may also be stored in a computer-readable storage medium. These instructions enable a computer, a programmable data processing apparatus and/or other devices to work in a specific way. Therefore, the computer-readable medium containing the instructions includes a product, which includes instructions to implement various aspects of the functions/actions specified in one or more blocks in the flowchart and/or the block diagram.

The computer-readable program instructions may be loaded onto a computer, other programmable data processing apparatus, or other devices, so that a series of operational steps may be executed on a computer, other programmable data processing apparatus, or other devices, to generate a computer-implemented process, such that the instructions which execute on a computer, other programmable data processing apparatuses, or other devices implement the functions/acts specified in one or more blocks in the flowchart and/or the block diagram.

The flowchart and the block diagram in the drawings show the possible architecture, functions and operations of the system, the method and the computer program product implemented in accordance with the present disclosure. In this regard, each block in the flowchart or the block diagram may represent a part of a unit, a program segment or instructions, which contains one or more executable instructions for implementing the specified logic function. In some alternative implementations, the functions labeled in the block may also occur in a different order from those labeled in the drawings. For example, two consecutive blocks may actually be executed in parallel, and sometimes can also be executed in a reverse order, depending on the functionality involved. It should also be noted that each block in the block diagram and/or the flowchart, and combinations of blocks in the block diagram and/or the flowchart, may be implemented by a dedicated hardware-based system that executes the specified functions or acts, or by the combination of dedicated hardware and computer instructions.

Each implementation of the present disclosure has been described above. The above description is an example, not exhaustive, and is not limited to the disclosed implementations. Without departing from the scope and spirit of the described implementations, many modifications and changes are obvious to those of ordinary skill in the art. The selection of terms used in the present disclosure aims to best explain the principles, practical application or improvement of technology in the market of each implementation, or to enable others of ordinary skill in the art to understand the various implementations disclosed herein.

The invention claimed is:

1. A method for managing a workflow, comprising:
in response to receiving a creation request, presenting a page for creating the workflow, the workflow being used to define a plurality of sequential operations in a predetermined task, the page comprising:
a first region for providing a plurality of nodes, the plurality of nodes comprising a model node for calling a machine learning model and a condition node for providing functionality of the condition node based on a conditional judgment associated with a predetermined condition, wherein a prompt is provided to the machine learning model, a response is received from the machine learning model, and the prompt comprises information determined by parameters of nodes located upstream of the model node among the plurality of nodes, and
a second region for providing a content of the workflow; and
in response to receiving an interaction request for the page, managing the workflow based on the interaction request.

2. The method of claim 1, wherein managing the workflow based on the interaction request comprises:
in response to receiving a selection request for a target node of the plurality of nodes:
adding a target node instance corresponding to the target node into the workflow; and
presenting the target node instance in the second region.

3. The method of claim 2, further comprising at least one of:

in response to receiving a first adding request, adding, into the target node instance, at least one input end for specifying at least one input data to be input to the target node instance; or
in response to receiving a second adding request, adding, into the target node instance, at least one output end for specifying at least one output data of the target node instance.

4. The method of claim 3, further comprising: for a first node instance and a second node instance in the workflow, in response to receiving a connection request for connecting an output end of at least one output end of the first node instance and an input end of at least one input end of the second node instance, presenting a connection relationship between the output end and the input end.

5. The method of claim 1, wherein the workflow comprises a model node instance corresponding to the model node, and the method further comprising: in response to receiving a setting request for setting relevant parameters of the machine learning model, setting the parameters based on the setting request, the parameters comprising at least one of: an identifier of the machine learning model, temperature information of the machine learning model, or a prompt input for being provided to the machine learning model.

6. The method of claim 1, wherein the plurality of nodes further comprises at least one of:
a code node for providing functionality of the code node with programming code;
a repository node for providing functionality of the repository node based on a search in the repository; or
a plug-in node for calling a plug-in loaded into a digital assistant to provide functionality of the plug-in node, the workflow being integrated in the digital assistant.

7. The method of claim 1, further comprising: in response to receiving a test request for testing the workflow, receiving at least one input data for being provided to the workflow.

8. The method of claim 7, further comprising: providing state data of a target node instance in the workflow, the state data comprising at least one of: data for at least one input end of the target node instance, data for at least one output end of the target node instance, or an execution state of whether the target node instance has successfully executed or not.

9. The method of claim 8, wherein providing the state data of the target node instance further comprises: in response to determining that the target node instance is a model node instance, providing at least one of: a prompt input provided to the machine learning model, or a response to the prompt input from the machine learning model.

10. The method of claim 1, further comprising: in response to receiving a publish request, publishing the workflow so that the workflow is integrated in a digital assistant.

11. A method for creating a digital assistant, comprising:
presenting a page for creating the digital assistant;
in response to receiving a request to add a workflow in the page, presenting a management page for adding the workflow to the digital assistant, the workflow being used to define a plurality of sequential operations in a predetermined task, the management page comprising:
a first region for providing a plurality of nodes, the plurality of nodes comprising a model node for calling a machine learning model and a condition node for providing functionality of the condition node based on a conditional judgment associated with a predetermined condition, wherein a prompt is provided to the machine learning model, a response is received from the machine learning model, and the prompt comprises information determined by parameters of nodes located upstream of the model node among the plurality of nodes, and a second region for providing a content of the workflow; and in response to receiving an interaction request to the management page, managing the workflow based on the interaction request.

12. An electronic device, comprising:

at least one processing unit; and at least one memory, the at least one memory being coupled to the at least one processing unit and storing instructions for execution by the at least one processing unit, the instructions, when executed by the at least one processing unit, causing the electronic device to perform operations comprising:

in response to receiving a creation request, presenting a page for creating a workflow, the workflow being used to define a plurality of sequential operations in a predetermined task, the page comprising:

a first region for providing a plurality of nodes, the plurality of nodes comprising a model node for calling a machine learning model and a condition node for providing functionality of the condition node based on a conditional judgment associated with a predetermined condition, wherein a prompt is provided to the machine learning model, a response is received from the machine learning model, and the prompt comprises information determined by parameters of nodes located upstream of the model node among the plurality of nodes, and a second region for providing a content of the workflow; and in response to receiving an interaction request for the page, managing the workflow based on the interaction request.

13. The device of claim 12, wherein managing the workflow based on the interaction request comprises:

in response to receiving a selection request for a target node of the plurality of nodes:

adding a target node instance corresponding to the target node into the workflow; and presenting the target node instance in the second region.

14. The device of claim 13, wherein the operations further comprise at least one of:

in response to receiving a first adding request, adding, into the target node instance, at least one input end for specifying at least one input data to be input to the target node instance; or in response to receiving a second adding request, adding, into the target node instance, at least one output end for specifying at least one output data of the target node instance.

15. The device of claim 14, wherein the operations further comprise: for a first node instance and a second node instance in the workflow, in response to receiving a connection request for connecting an output end of at least one output end of the first node instance and an input end of at least one input end of the second node instance, presenting a connection relationship between the output end and the input end.

16. The device of claim 12, wherein the workflow comprises a model node instance corresponding to the model node, and the workflow further comprises: in response to receiving a setting request for setting relevant parameters of the machine learning model, setting the parameters based on the setting request, the parameters comprising at least one of: an identifier of the machine learning model, temperature information of the machine learning model, or a prompt input for being provided to the machine learning model.

17. The device of claim 12, wherein the plurality of nodes further comprises at least one of:

a code node for providing functionality of the code node with programming code;

a repository node for providing functionality of the repository node based on a search in the repository; or a plug-in node for calling a plug-in loaded into a digital assistant to provide functionality of the plug-in node, the workflow being integrated in the digital assistant.

18. The device of claim 12, wherein the operations further comprise: in response to receiving a test request for testing the workflow, receiving at least one input data for being provided to the workflow.

19. The device of claim 18, wherein the operations further comprise: providing state data of a target node instance in the workflow, the state data comprising at least one of: data for at least one input end of the target node instance, data for at least one output end of the target node instance, or an execution state of whether the target node instance has successfully executed or not.

20. The device of claim 19, wherein providing the state data of the target node instance further comprises: in response to determining that the target node instance is a model node instance, providing at least one of: a prompt input provided to the machine learning model, or a response to the prompt input from the machine learning model.

* * * * *